United States Patent
Chang et al.

(10) Patent No.: US 9,820,597 B1
(45) Date of Patent: Nov. 21, 2017

(54) METAL DRINKING STRAW

(71) Applicants: Fu-Nan Chang, Taoyuan (TW);
Jui-Ling Lee, Taoyuan (TW)

(72) Inventors: Fu-Nan Chang, Taoyuan (TW);
Jui-Ling Lee, Taoyuan (TW)

(*) Notice: Subject to any disclaimer, the term of this patent is extended or adjusted under 35 U.S.C. 154(b) by 0 days.

(21) Appl. No.: 15/157,595

(22) Filed: May 18, 2016

(51) Int. Cl.
| | | |
|---|---|---|
| *A47G 21/18* | (2006.01) | |
| *B23K 26/364* | (2014.01) | |
| *B23K 26/38* | (2014.01) | |
| *B23K 26/00* | (2014.01) | |

(52) U.S. Cl.
CPC ........... *A47G 21/18* (2013.01); *A47G 21/181* (2013.01); *B23K 26/0087* (2013.01); *B23K 26/364* (2015.10); *B23K 26/38* (2013.01)

(58) Field of Classification Search
CPC ........................................ A47G 21/18–21/189
USPC ..................................................... 239/33, 16
See application file for complete search history.

(56) References Cited

U.S. PATENT DOCUMENTS

| | | | | |
|---|---|---|---|---|
| 4,340,175 | A * | 7/1982 | Danek | A47G 21/182 |
| | | | | 239/33 |
| 5,156,335 | A * | 10/1992 | Smith | A47G 21/188 |
| | | | | 210/266 |
| 5,273,649 | A * | 12/1993 | Magnusson | C02F 1/002 |
| | | | | 210/232 |
| 2004/0112826 | A1 * | 6/2004 | Chiba | A47G 21/188 |
| | | | | 210/454 |
| 2004/0182461 | A1 * | 9/2004 | Margetson | A47G 21/188 |
| | | | | 138/109 |
| 2006/0192025 | A1 * | 8/2006 | White | A23G 3/50 |
| | | | | 239/33 |
| 2009/0065605 | A1 * | 3/2009 | Roche | A47G 21/18 |
| | | | | 239/33 |
| 2010/0127005 | A1 * | 5/2010 | Sanbrook | A47G 19/2266 |
| | | | | 220/705 |
| 2011/0011946 | A1 * | 1/2011 | White | A47G 21/182 |
| | | | | 239/33 |

\* cited by examiner

*Primary Examiner* — Chee-Chong Lee
(74) *Attorney, Agent, or Firm* — Jackson IPG PLLC; Demian K. Jackson

(57) ABSTRACT

An improved metal drinking straw is provided. The improved metal drinking straw includes an outer wall provided with a rough surface, an inner wall formed as a smooth mirror surface, and one end formed as a guiding structure. The guiding structure includes at least one first recess and at least one first protrusion. The first recess and the first protrusion are alternately connected.

2 Claims, 19 Drawing Sheets

METAL DRINKING STRAW

BACKGROUND OF THE INVENTION a) Field of the Invention

The invention relates in general to a metal drinking straw, and more particularly, to an improved metal drinking straw capable of increasing a flowing speed of a fluid to enhance an insulation effect, reducing temperature conduction efficiency of the straw wall to increase comfort in holding for a user, and easily penetrating through a sealing film as well as preventing fluid overflow.

b) Description of the Prior Art

Drinking straws are one of common necessary convenience goods in the daily lives of people. Adults, infants and elderly all use drinking straws to assist in drinking water or beverages. Particularly, as the modern society pattern has evolved such that people's diet has also become different, breakfast shops and beverage shops are seen everywhere in almost every street, and people are used to the convenience of buying beverages for quenching thirst, cooling down or warming up. Given that breakfast shops provide a sealing film on the top of cups, beverages can be readily purchased and carried. Thus, drinking beverages with a sealing film require the assistance of drinking straws for better convenience.

Current commercially available drinking straws are commonly made of plastic materials, and the reason is apparently that drinking straws have been regarded as one-time use products. Considering factors of being disposable and low-cost, only plastic materials that are low in production costs and can be mass produced at a fast speed are adopted for making drinking straws, as disposable chopsticks and plastic spoons.

In the recent years, with the awakening of environmental awareness of the mass, and food safety and hygiene news events disclosed one after another, people have learned that plastic drinking straws may release toxic plasticizing agent components in a high-temperature beverage. Further, if a beverage is acidic, plastic drinking straws also erode and dissolve to release toxins. It is obvious that people have become aware of the hazards of plastic products. Therefore, the number of restaurants that have switched from using disposable chopsticks and plastic spoons to metal chopsticks and metal spoons keeps increasing. Further, there are currently drinking straws that are made of metal materials instead of plastic materials.

Although drinking straws made of metal materials meet requirements of go green and prevent users from in-taking plasticizing agents, conventional metal drinking straws suffer from following issues. First of all, a fluid in a metal drinking straw flows slower, leading to a less satisfactory insulation effect in the straw. Secondly, the wall of a metal drinking straw has a fast temperature conduction speed, such that the temperature of the fluid is rapidly conducted to the outer wall of the metal drinking straw. If the fluid is too cold or too hot, the user may feel discomfort when holding the metal straw. Thirdly, two end openings of a common metal straw are both in a flat form, in a way that a sealing film cannot be readily penetrated by the metal drinking straw and the fluid may easily overflow while the sealing film is being penetrated. In view of the above, based on researching, developing and design experiences of related products of many years, and with careful design and evaluation, the Applicant provides a practical and useful solution for overcoming the foregoing issues.

SUMMARY OF THE INVENTION

In view of the issues of the prior art, it is an object of the present invention to provide an improved metal drinking straw capable of increasing a flowing speed of a fluid to enhance an insulation effect, and reducing temperature conduction efficiency of the straw wall to increase comfort in holding for a user.

It is another object of the present invention to provide an improved metal drinking straw that is a symmetrical metal tube member through a cutting process, such that an opening of the metal drinking straw includes a wavy guiding structure, thereby increasing the practicability and esthetic values of the metal tube member.

It is another object of the present invention to provide an improved metal drinking straw, in which the guiding structure is used, such that the improved metal drinking straw of the present invention is capable of easily penetrating through a film and preventing fluid overflow while the film is penetrated, thereby facilitating drinking the beverage or iced beverage in a cup.

To achieve the above objects, the present invention provides an improved metal drinking straw. The improved metal drinking straw includes an outer wall provided with a rough surface, and an inner wall formed as a smooth mirror surface. Further, the improved metal drinking straw has one end formed as a guiding structure, which includes at least one first recess and at least one protrusion. The first recess and the first protrusion are alternately connected.

To achieve the above objects, the present invention further provides an improved metal drinking straw. The improved metal drinking straw includes at least one metal tube member with one end formed as a guiding structure. The guiding structure includes at least one recess, at least one protrusion and a penetrating portion. The recess and the protrusion are alternately connected. The penetrating portion extends from one side of the metal tube member being adjacent to the recess, and includes a pointed end protruding by a distance compared to an arc top of the protrusion.

The above and other aspects of the invention will become better understood with regard to the following detailed description of the preferred but non-limiting embodiments. The following description is made with reference to the accompanying drawings.

DETAILED DESCRIPTION OF THE PREFERRED EMBODIMENTS

To better understand technical features, contents, advantages and achieved effects of the present invention, details of the present invention are given in the non-limiting embodiments with the accompanying drawings below. It should be noted that, the drawings used in the application are illustrative for assisting one to better understand the application, and may not be drawn to actual ratios and configuration as in implementation of the present invention. Therefore, the ratios and configuration relationships in the appended drawings are not to be construed as limitations to the implementation scope of the present invention.

Figure 1:
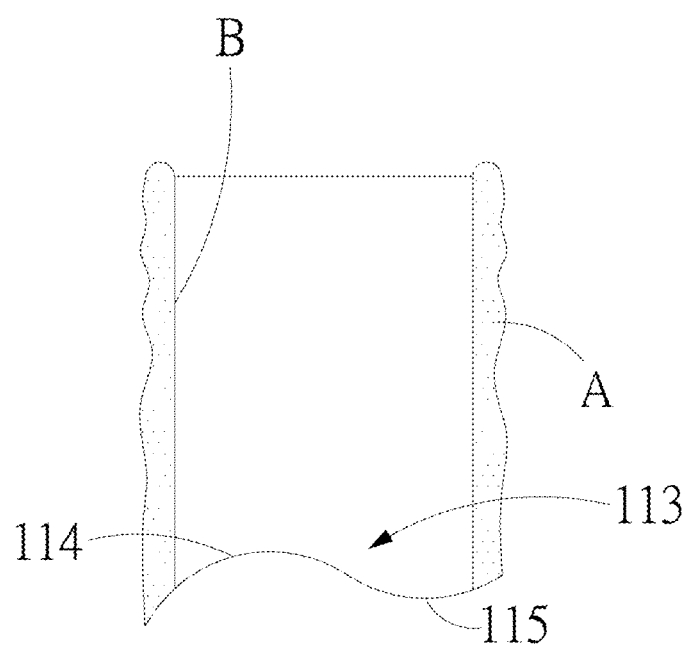
FIG. 1 is a first schematic diagram of an improved metal drinking straw according to a first embodiment of the present invention.

FIG. 1 shows a first schematic diagram of an improved metal drinking straw according to a first embodiment of the present invention. As shown, an improved metal drinking straw 10 of the present invention includes an outer wall provided with a rough surface A, and an inner wall formed as a smooth mirror surface B. Further, the improved metal drinking straw 10 has one end formed as a guiding structure 113. The guiding structure 113 includes at least one first recess 114 and at least one first protrusion 115. The first recess 114 and the first protrusion 115 are alternately connected. Further, preferably, the precision of the smooth mirror surface B formed at the inner wall of the improved metal drinking straw 10 is below 0.01 μm. Using the smooth mirror surface B formed at the inner wall of the improved metal drinking straw 10 of the present invention, friction of a fluid in the tube is reduced to increase a flowing speed to form better internal insulation. Using the rough surface A formed at the outer wall of the improved metal drinking straw 10, the temperature of the fluid in the tube is prevented from rapidly conducted to the exterior, hence providing a user with a more comfortable holding sensation. Further, using the guiding structure 113 formed at one end of the improved metal drinking straw 10, a beverage sealing film or a fruit surface can be penetrated through to guide the fluid, and the fluid is prevented from overflowing outside the tube while the sealing film is penetrated.

Figure 2:
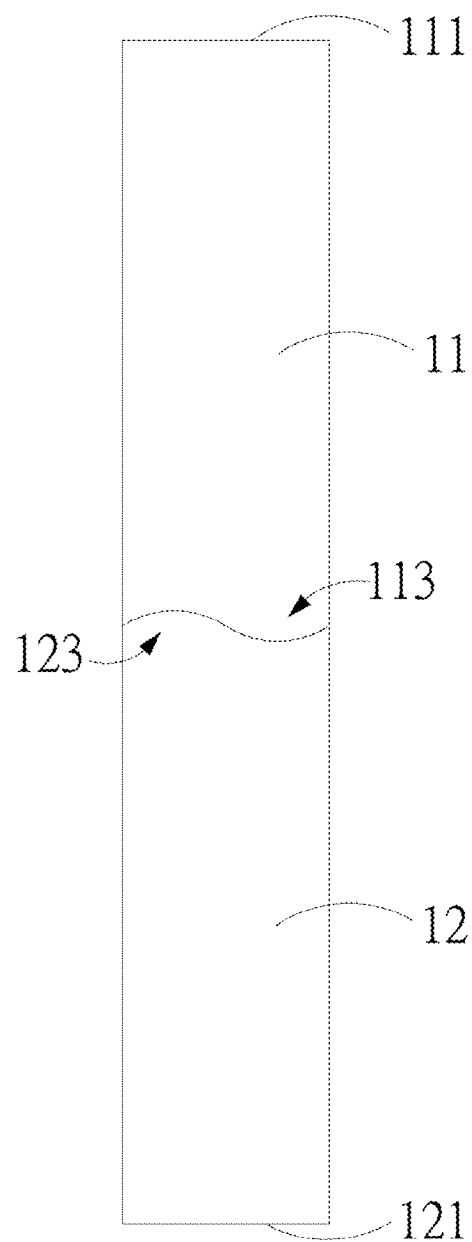
FIG. 2 is a second schematic diagram of an improved metal drinking straw according to the first embodiment of the present invention.
Figure 3:
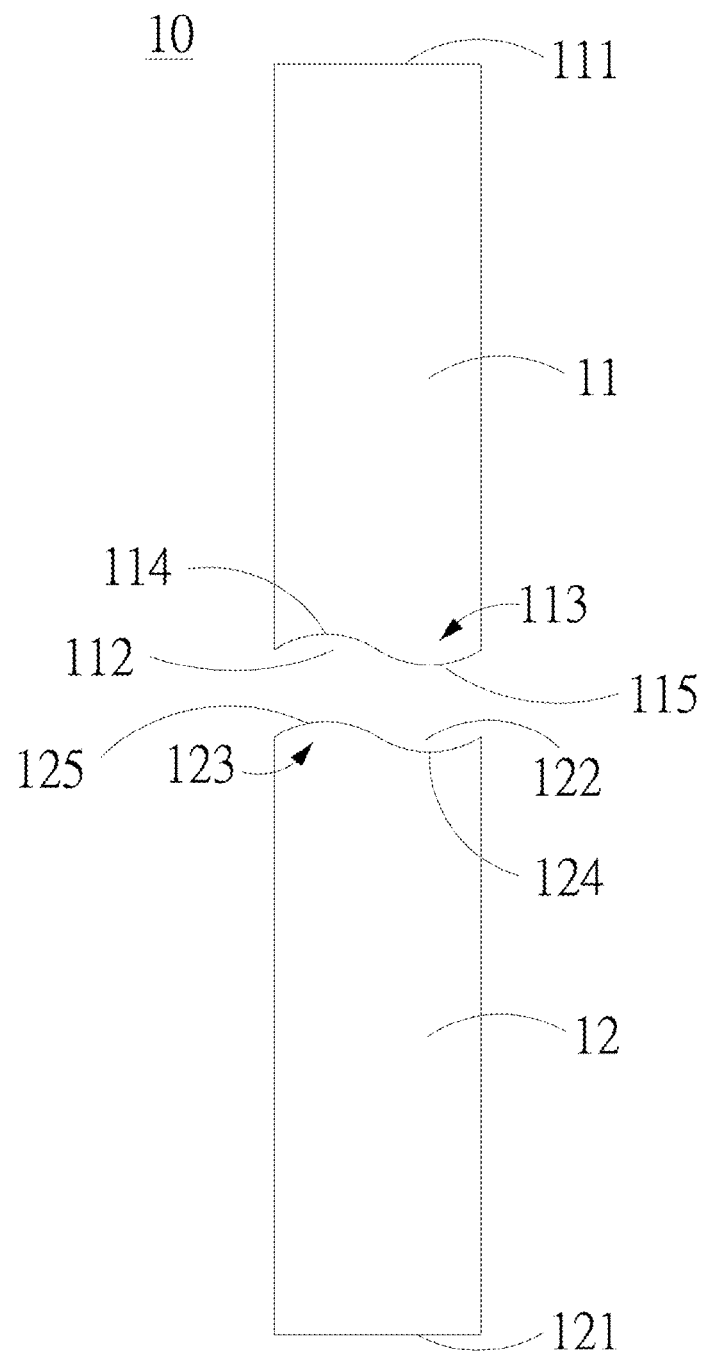
FIG. 3 is a third schematic diagram of an improved metal drinking straw according to the first embodiment of the present invention.
Figure 4:
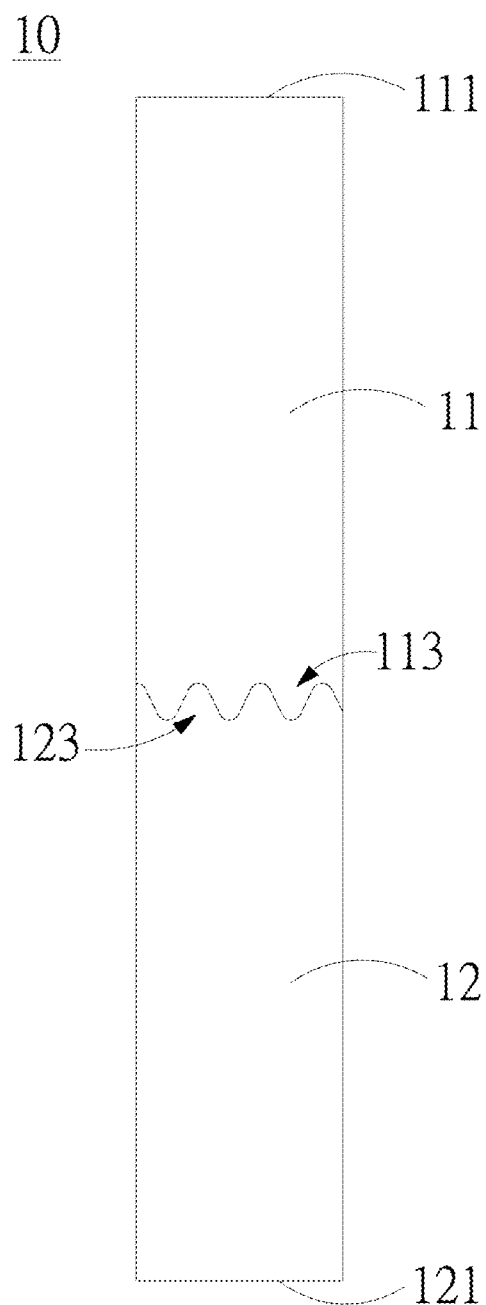
FIG. 4 is a first schematic diagram of an improved metal drinking straw according to a second embodiment of the present invention.
Figure 5:
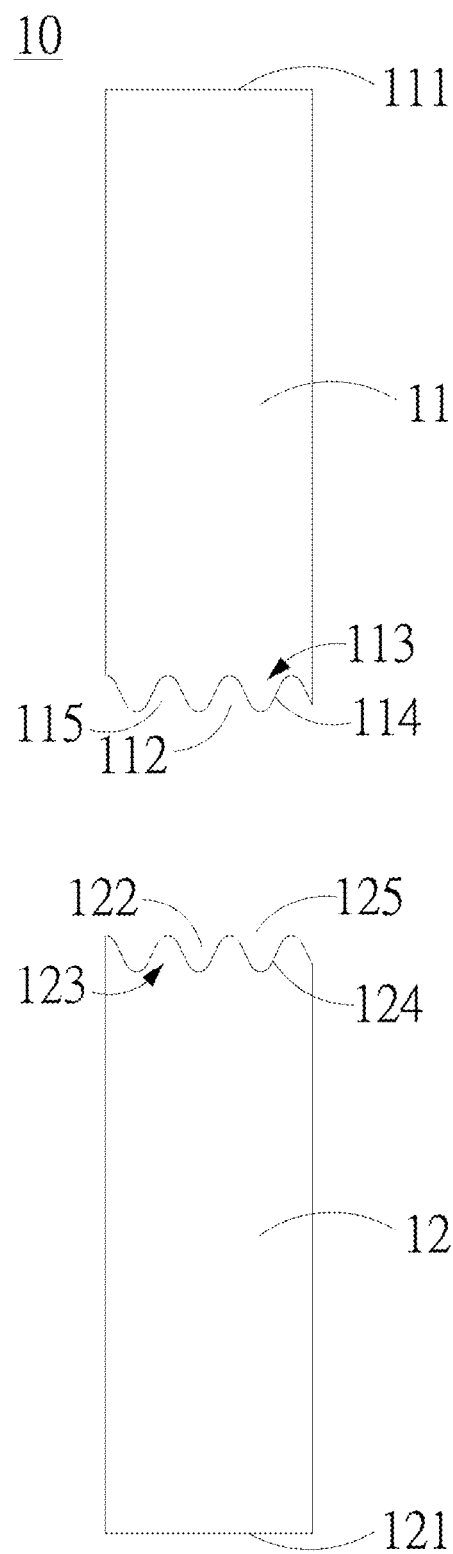
FIG. 5 is a second schematic diagram of an improved metal drinking straw according to the second embodiment of the present invention.
Figure 6:
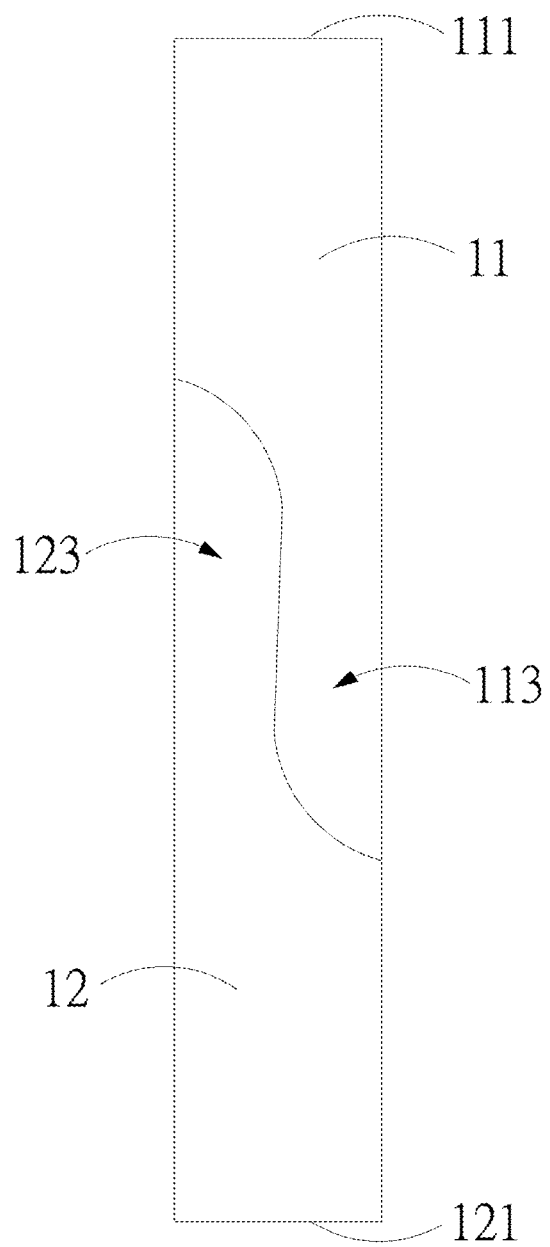
FIG. 6 is a first schematic diagram of an improved metal drinking straw according to a third embodiment of the present invention.
Figure 7:
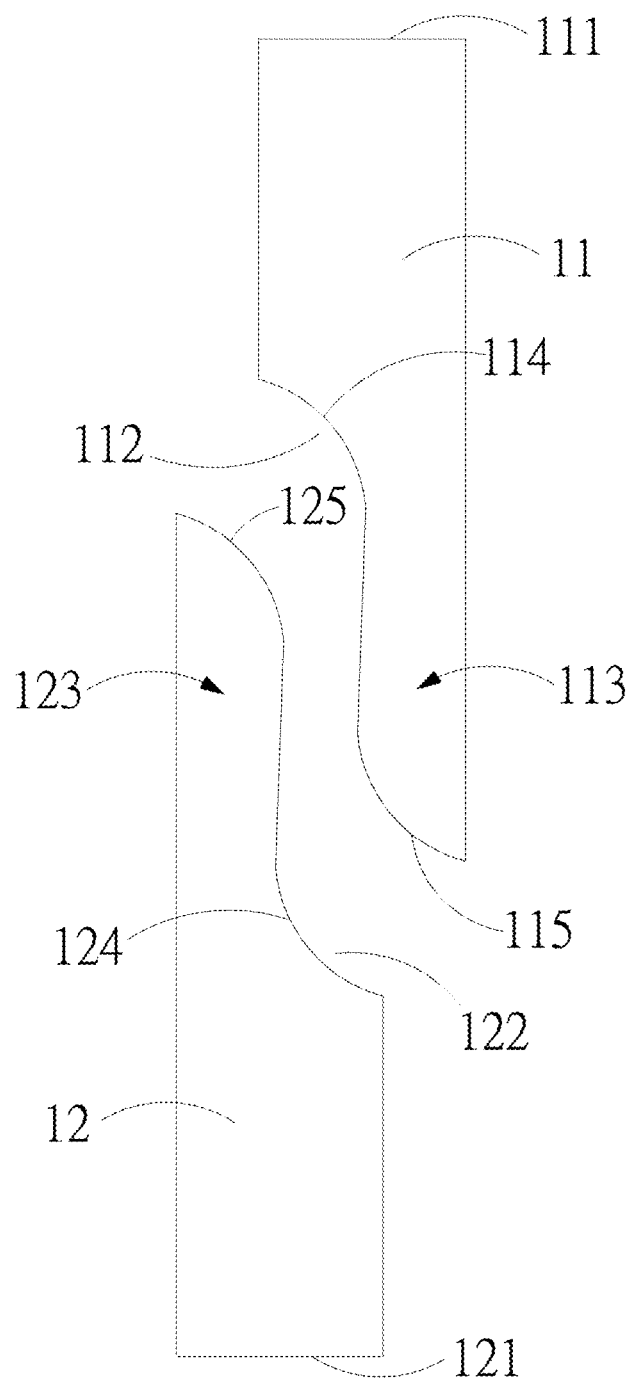
FIG. 7 is a second schematic diagram of an improved metal drinking straw according to the third embodiment of the present invention.

Referring to FIG. 2 showing is a second schematic diagram of an improved metal drinking straw according to the first embodiment of the present invention, FIG. 3 showing a third schematic diagram of an improved metal drinking straw according to a first embodiment of the present invention, FIG. 4 showing a first schematic diagram of an improved metal drinking straw according to a second embodiment of the present invention, FIG. 5 showing a second schematic diagram of an improved metal drinking straw according to the second embodiment of the present invention, FIG. 6 showing a first schematic diagram of an improved metal drinking straw according to a third embodiment of the present invention, and FIG. 7 showing a second schematic diagram of an improved metal drinking straw according to the third embodiment of the present invention, the improved metal drinking straw 10 of the present invention may form a plurality of tube members through processing. More specifically, the improved metal drinking straw 10 at least includes a first metal tube member 11 and a second metal tube member 12. The first metal tube member 11 is a hollow tube, which includes a first opening 111 and a second opening 112. The second opening 112 forms the foregoing guiding structure 113. The second metal tube member 12 is a hollow tube, which includes a third opening 121 and a fourth opening 122. The fourth opening 122 forms a guiding structure 123. The guiding structure 123 at the fourth opening 122 corresponds to the guiding structure 113 at the second opening 112. The guiding structure 123 includes at least one second recess 124 and at least one second protrusion 125. The second recess 124 and the second protrusion 125 are alternately connected. With only one process, the improved metal drinking straw 10 can be symmetrically disengaged to obtain the first metal tube member 11 and the second metal tube member 12, and the effects of obtaining symmetry and having one end of each of the first metal tube member 11 and the second metal tube member 12 correspond to a wavy guiding structure can be obtained.

The first metal tube member 11 and the second metal tube member 12 each has one end forming the guiding structures 113 and 123 through a cutting process. For example, the cutting process is a line cutting process or a laser cutting process to obtain the guiding structures with smoothness without involving power for a further process that grinds and removes rough edges. Thus, the tube of the improved metal drinking straw 10 can be rapidly processed through a computerized numerical control (CNC) module to obtain a precise predetermined guiding structure. Further, the wall thickness of the improved metal drinking straw 10 may be 0.2 mm to 1.5 mm, preferably 0.3 mm, so as to promote the efficiency of the cutting process.

Figure 8:
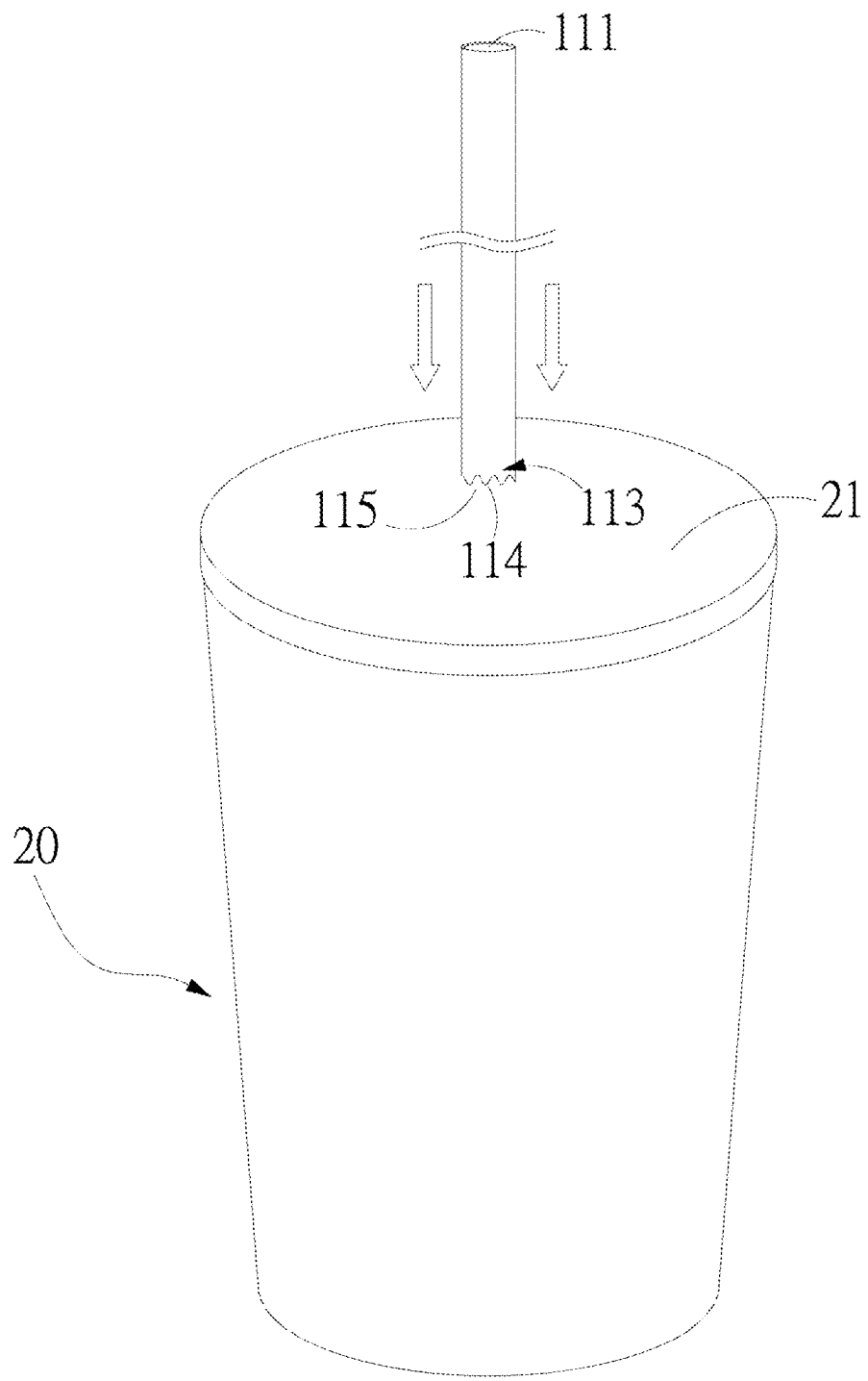
FIG. 8 is a state diagram of an improved metal drinking straw of the present invention in application.

As shown in FIG. 8, the improved metal drinking straw 10 from by a cutting process at least includes a first metal tube member 11. The first metal tube member 11 is a hollow tube, and includes a first opening 111 and the second opening 112. A guiding structure 113 is formed at the second opening 112, and includes at least one first recess 114 and at least one first protrusion 115. The first recess 114 and the first protrusion 115 are alternately connected. The improved metal drinking straw 10 according to this embodiment is particularly suitable for a beverage cup having a film 21. To drink the beverage, the guiding structure 113 is pressed on the film 21 using the first metal tube member 11. Thus, the film 21 can be easily penetrated to facilitate immediately drinking the beverage in the beverage cup 20 using the first metal tube member 11.

Figure 9:
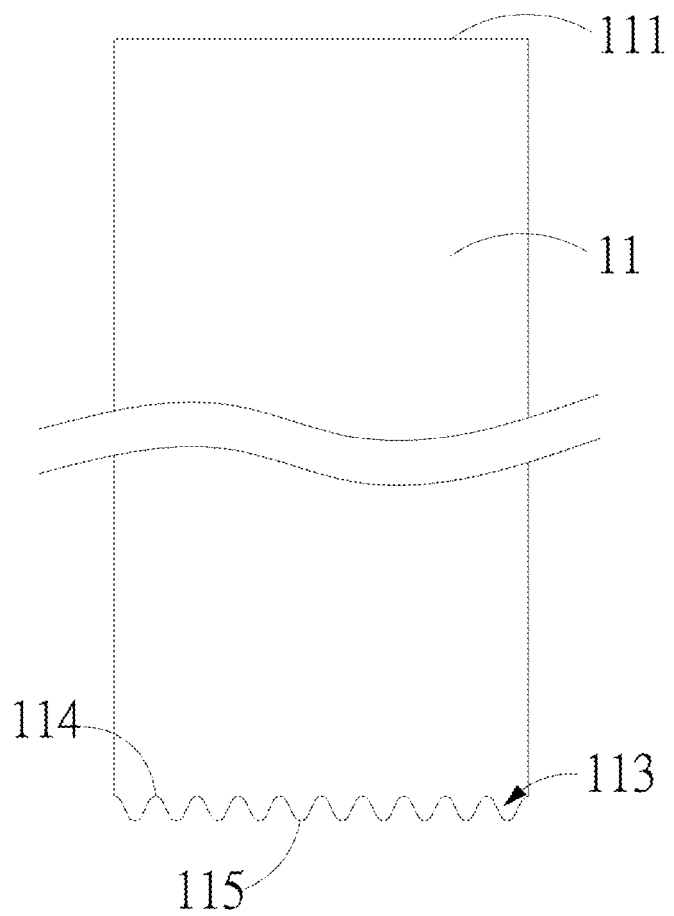
FIG. 9 is a schematic diagram of an improved metal drinking straw according to a fourth embodiment of the present invention.

As shown in FIG. 9, the guiding structure 113 may include the first recess 114 and the first protrusion 115, which are alternately connected in succession to achieve a wavy esthetic value. Not only the film can easily penetrated by pressing the guiding structure 113 using the first metal tube member 11 to drink the beverage in the beverage cup using the first metal tube member 11, but also the wavy form is capable of increasing a stopping point when the film is penetrated.

Figure 10:
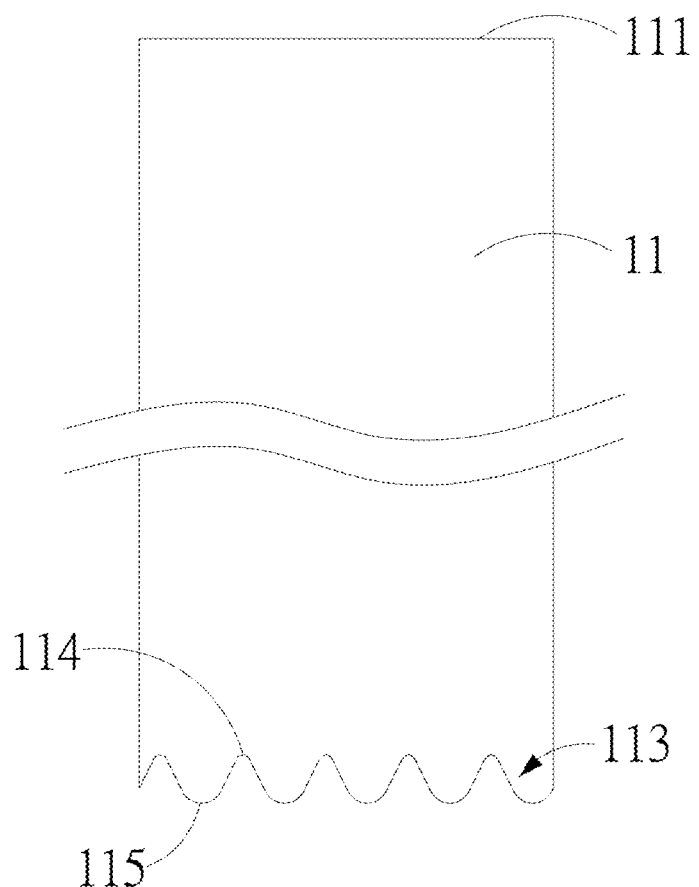
FIG. 10 is a schematic diagram of an improved metal drinking straw according to a fifth embodiment of the present invention.
Figure 11:
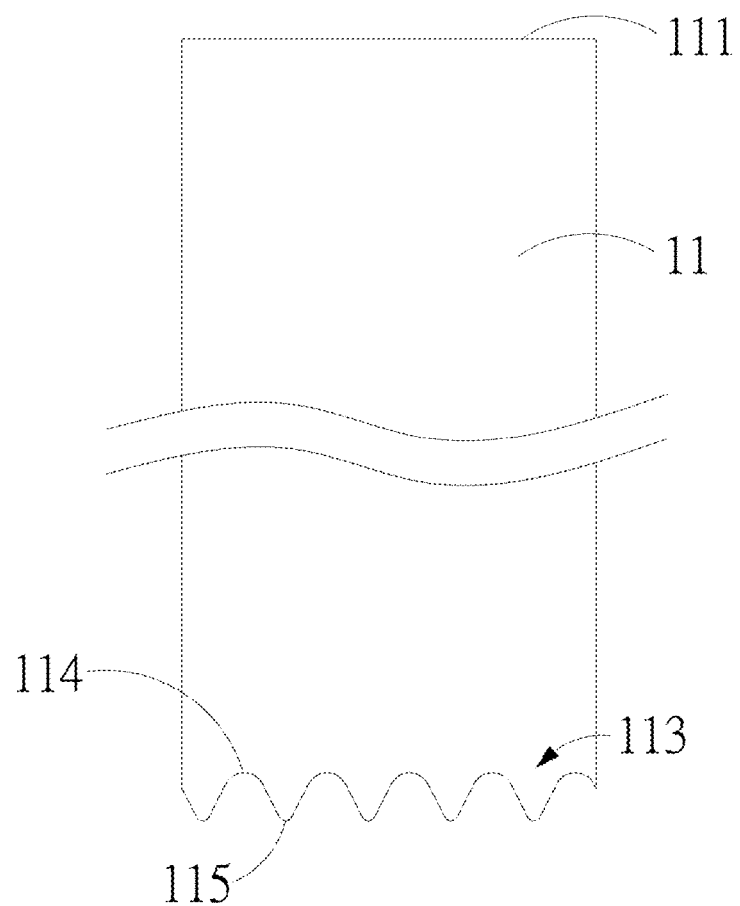
FIG. 11 is a schematic diagram of an improved metal drinking straw according to a sixth embodiment of the present invention.
Figure 12:
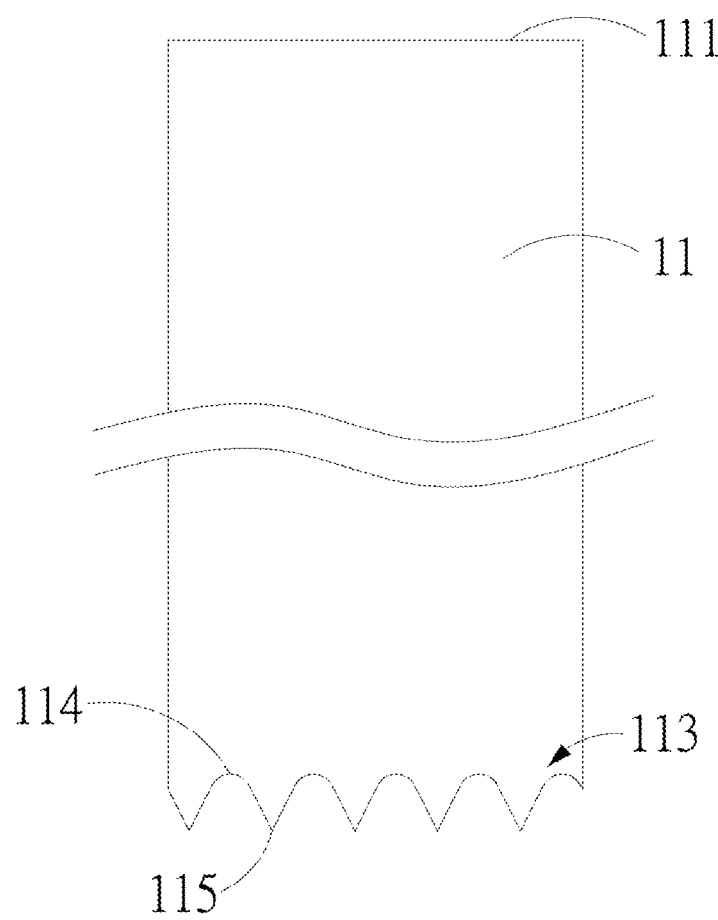
FIG. 12 is a schematic diagram of an improved metal drinking straw according to a seventh embodiment of the present invention.

As shown in FIG. 9, the first recess 114 and the first protrusion 115 are arcs that are alternately connected. Further the first recess 114 and the first protrusion 115 may have the same diameter, and are alternately connected in succession. Alternatively, as shown in FIG. 10 and FIG. 11, the first recess 114 and the first protrusion 115 may have different diameters, and are alternately connected in succession. Alternatively, as shown in FIG. 11, one of the first recess 114 and the first protrusion 115 may be a slightly pointed form and the other may be an arc, and the first recess 114 and the first protrusion 115 are alternately connected in succession.

Figure 13:
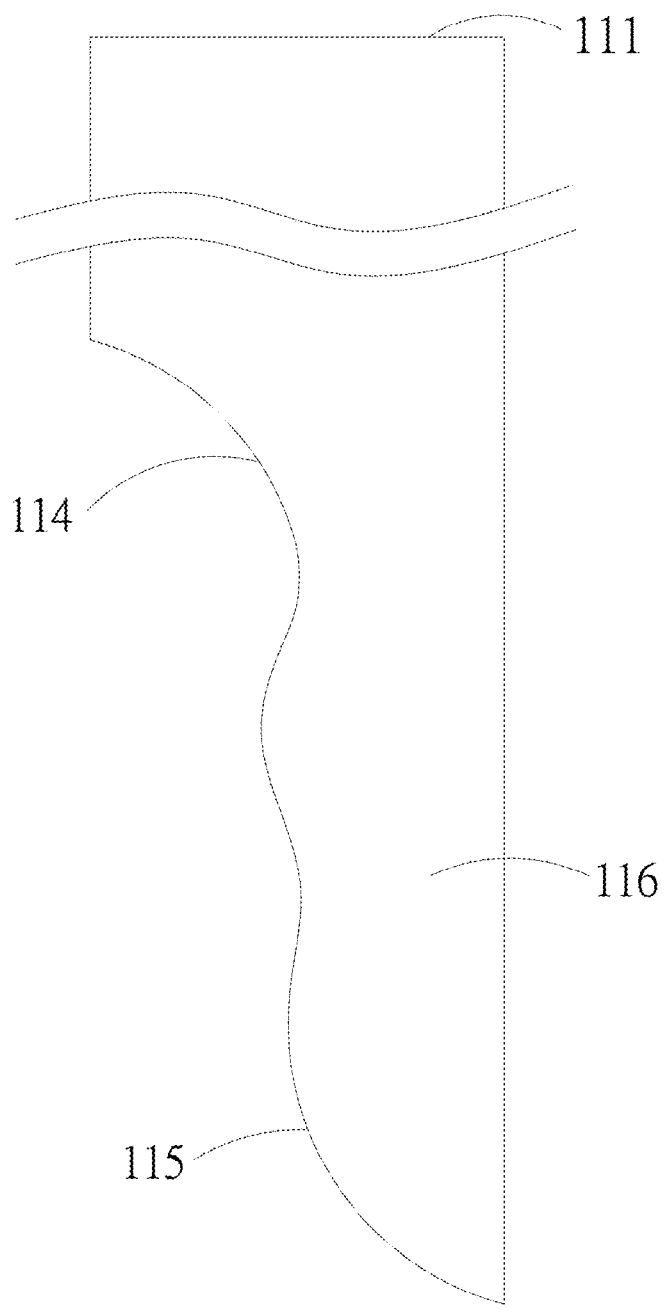
FIG. 13 is a schematic diagram of an improved metal drinking straw according to an eighth embodiment of the present invention.

Further, as shown in FIG. 13, the guiding structure 113 may extend outwards to form a skirt portion 116. The first recess 114 and the first protrusion 115 are disposed at an edge of the skirt portion 116.

Figure 14:
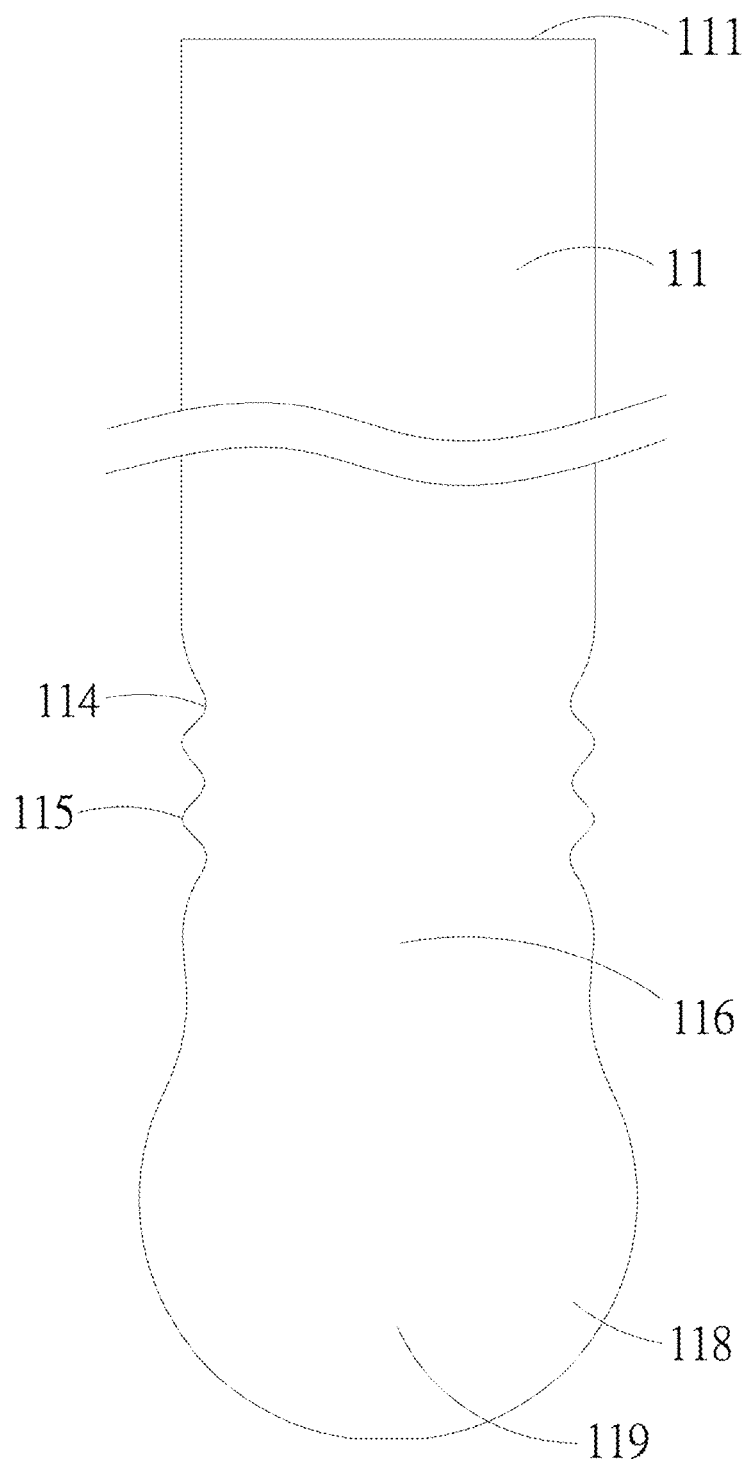
FIG. 14 is a schematic diagram of an improved metal drinking straw according to a ninth embodiment of the present invention.

Further, as shown in FIG. 14, the guiding structure 113 may extend outwards to form a skirt portion 116. The first recess 114 and the first protrusion 115 are disposed at an edge of the skirt portion 116. Further, the skirt portion 116 extends to two sides to form an expanded portion 117 to further form a spoon body 118. Thus, the film can be easily penetrated by pressing the film using the guiding structure 113 to use the first metal tube member 11 to suck and drink the beverage in the beverage cup. Further, the guiding structure 113 may be used to softly pierce through fruit peel, and insert into the fruit to stir and mince the fruit flesh. As such, not only fresh fruit flesh may be sucked and eaten, but also food ingredients in the beverage cut can be scooped and eaten using the spoon body 118.

Figure 15:
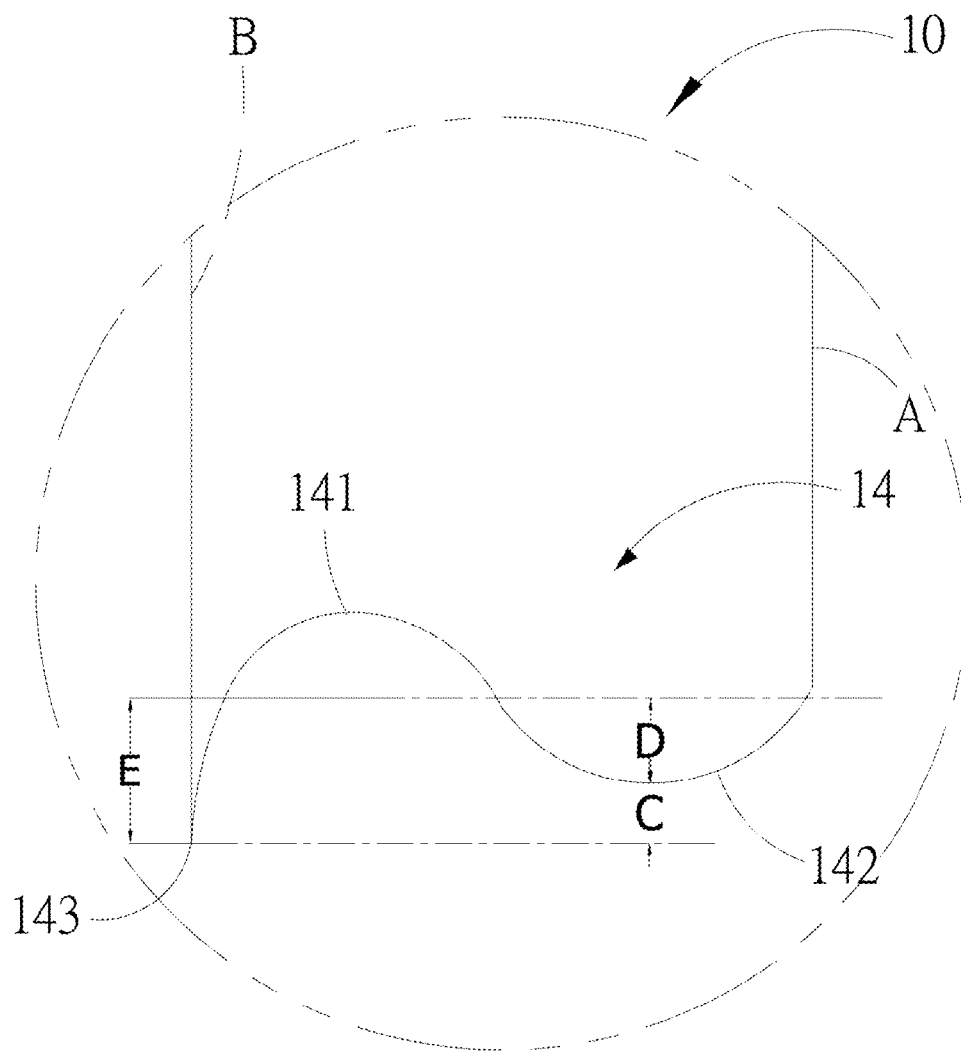
FIG. 15 is a first schematic diagram of an improved metal drinking straw according to a tenth embodiment of the present invention.
Figure 16:
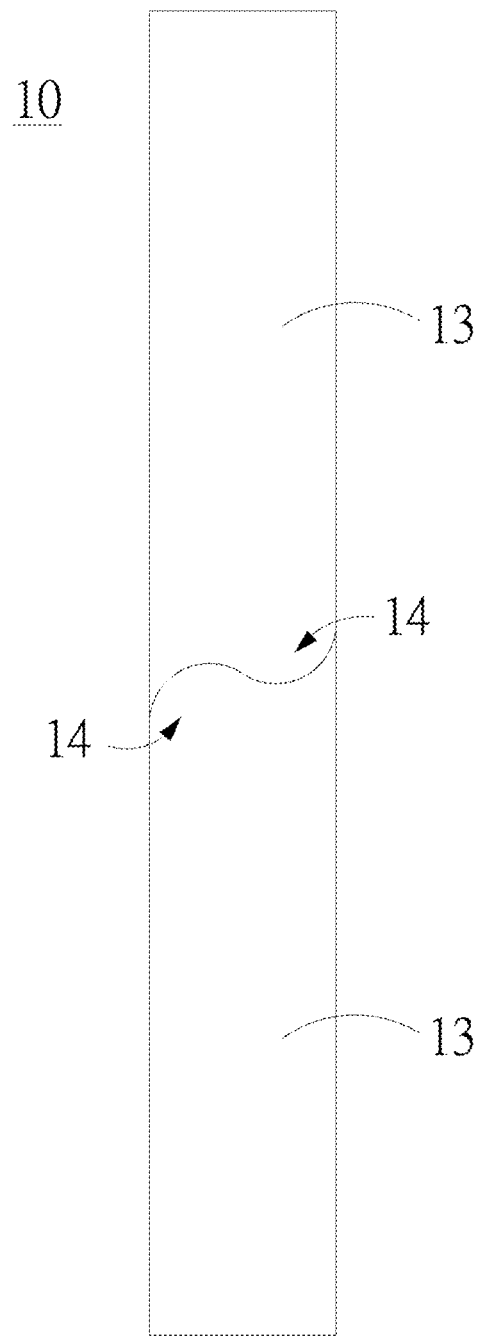
FIG. 16 is a second schematic diagram of an improved metal drinking straw according to the tenth embodiment of the present invention.
Figure 17:
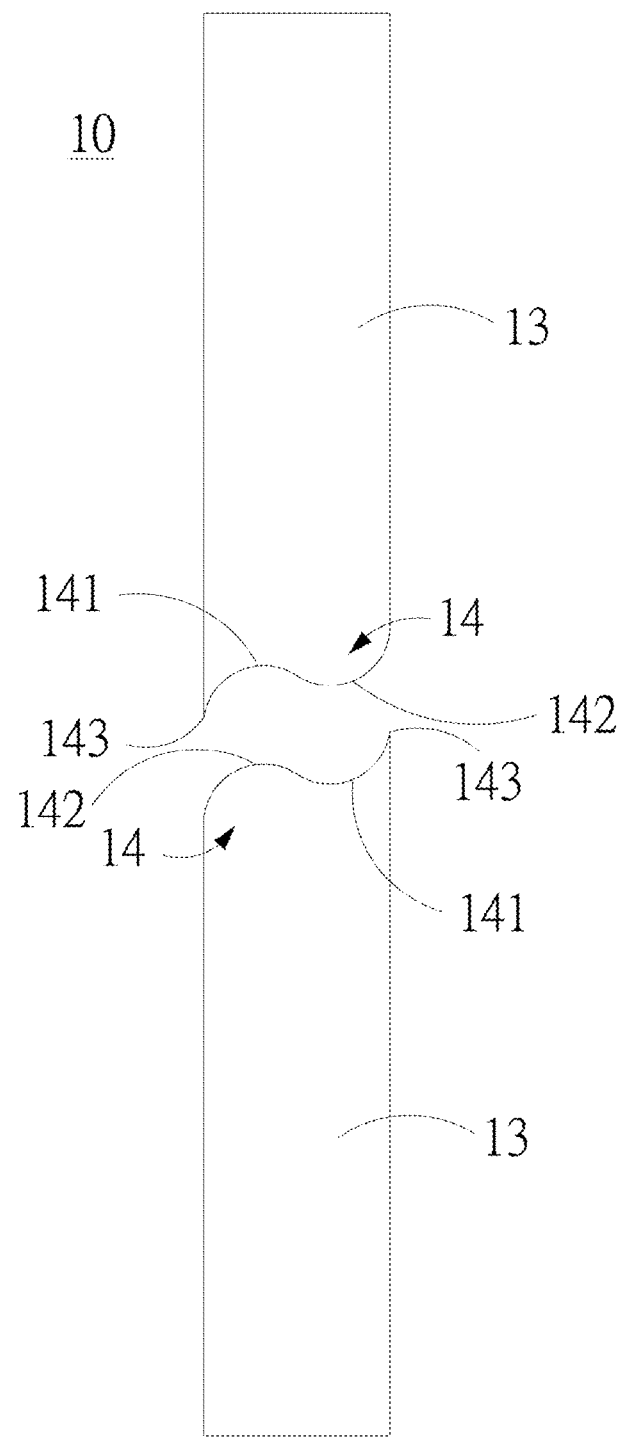
FIG. 17 is a third schematic diagram of an improved metal drinking straw according to the tenth embodiment of the present invention.
Figure 18:
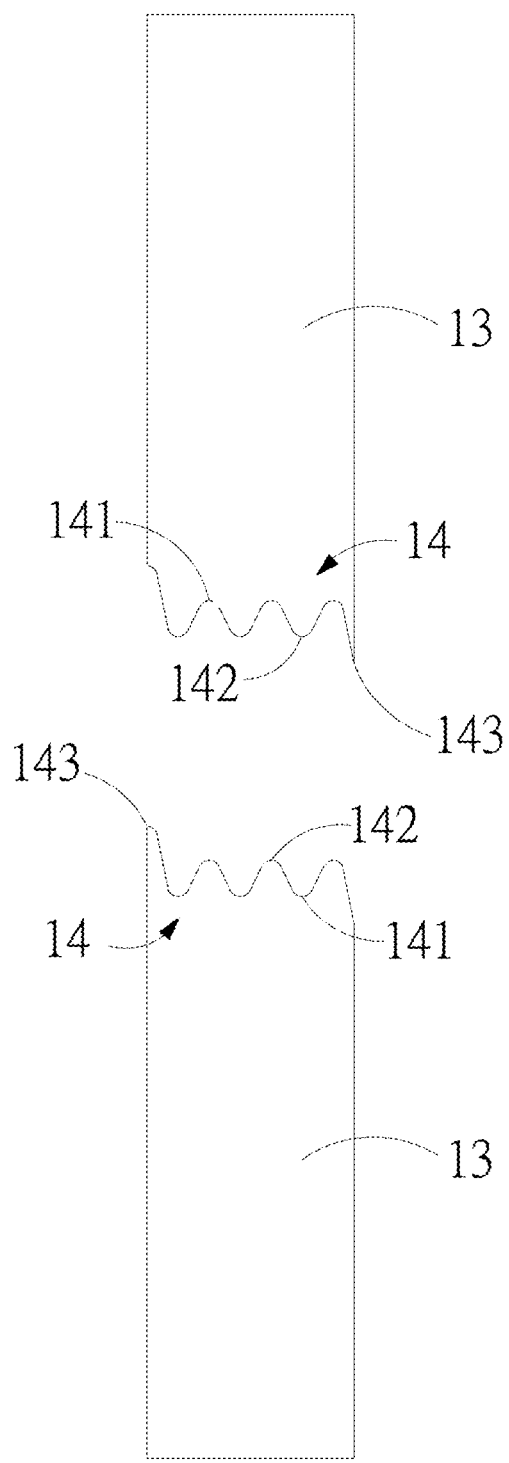
FIG. 18 is a schematic diagram of an improved metal drinking straw according to an eleventh embodiment of the present invention.
Figure 19:
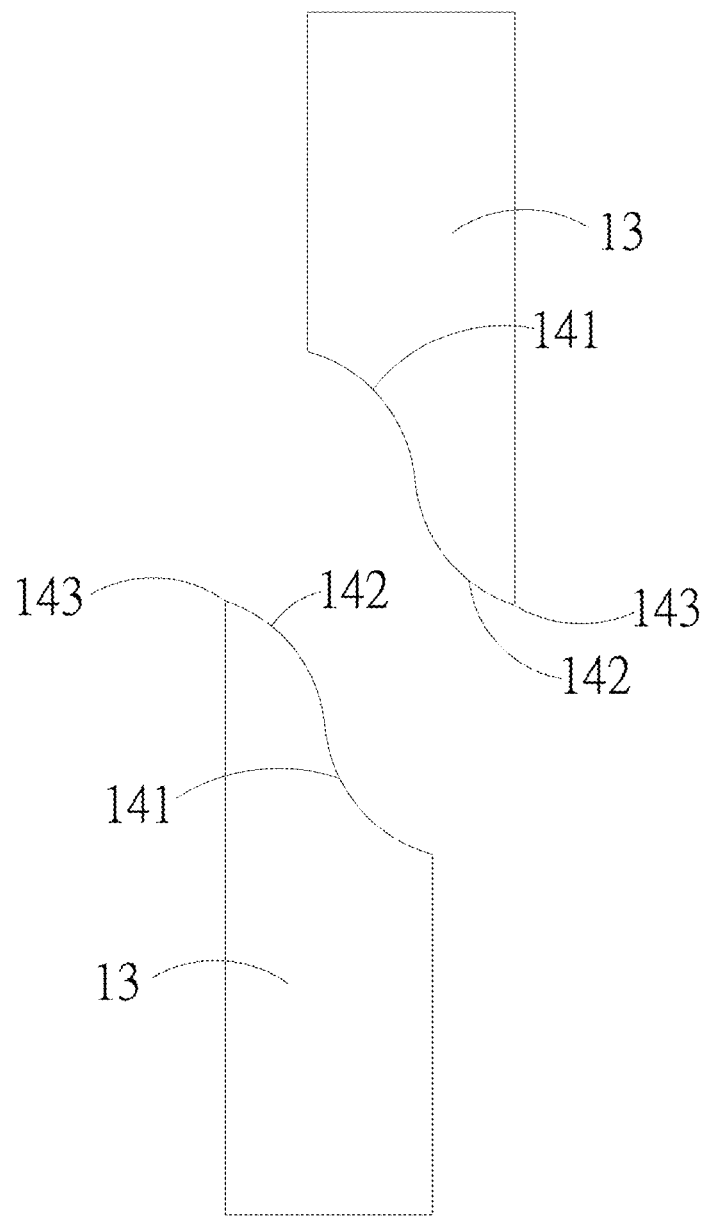
FIG. 19 is a schematic diagram of an improved metal drinking straw according to a twelfth embodiment of the present invention.

FIG. 15 to FIG. 17 respectively show a first schematic diagram, a second schematic diagram and a third schematic diagram of an improved metal drinking straw according to a tenth embodiment of the present invention. FIG. 18 shows a schematic diagram of an improved metal drinking straw according to an eleventh embodiment of the present invention. FIG. 19 shows a schematic diagram of an improved metal drinking straw according to a twelfth embodiment of the present invention. Referring to FIG. 15 to FIG. 19, the improved metal drinking straw 10 of the present invention may include at least one metal tube member 13 having one end formed as a guiding structure 14. The guiding structure 14 includes at least one recess 141, at least one protrusion 142 and a penetrating portion 143. The recess 141 and the protrusion 142 are alternately connected. The penetrating portion 143 is extended from one side of the metal tube member 13, and includes a pointed end that protrudes by a distance C compared to an arc top of the protrusion 142. Preferably, the distance C from the pointed end of the penetrating portion 143 to the arc top of the protrusion 142 may be 0.5 mm to 3 mm, preferably 1.5 mm. In the tenth embodiment and the eleventh embodiment, the penetrating portion 143 is adjacent to the recess 141. In the twelfth embodiment, the penetrating portion 143 is adjacent to the protrusion 142.

In the above, the distances D from the arc top of the recess 141 and the arc top of the protrusion 142 to a central line between the recess 141 and the protrusion 142 are equal. Preferably, the distances D from the arc top of the recess 141 and the arc top of the protrusion 142 to the central line is one half of the distance E from the pointed end of the penetrating portion 143 to the central line.

Further, the metal tube member 13 in the tenth to twelfth embodiment includes the outer wall provided a rough surface A, and the inner wall formed as a smooth mirror surface B. Preferably, for example but not limited to, the precision of the smooth mirror surface B formed at the inner wall of the metal tube member 13 is 0.01 μm. In the tenth, eleventh and twelfth embodiments, the metal tube member 13 is in a quantity of two. The guiding structure 14 provided at one end of each of the two metal tube members 13 corresponds to each other, such that the two metal tube members 13 may coordinate with each other through the guiding structures 13.

In conclusion, the improved metal drinking straw of the present invention made a break-through from the prior art to achieve intended effects, and is not easily anticipated by one person skilled in the art. Further, the present invention, having not been previously disclosed, provides novelty and usefulness that meet patent application requirements.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved metal drinking straw, comprising an outer wall including an uneven-shaped surface disposed therearound, an inner wall formed as a mirror surface, and one end formed as a wave-shaped guiding structure, the wave-shaped guiding structure including at least one first recess and at least one first protrusion, the at least one first recess and the at least one first protrusion being alternately connected,
   wherein a precision of the mirror surface formed at the inner wall of the improved metal drinking straw is 0.01 mm; a well thickness of the improved metal drinking straw is 0.2 mm to 1.5 mm,
   the improved metal drinking straw further comprising at least one first metal tube member, the at least one first metal tube member being a hollow tube and comprising a first opening and a second opening, the wave-shaped guiding structure being formed at the second opening.

2. The improved metal drinking straw according to claim 1, further comprising a second metal tube member, the second metal tube member being a hollow tube and comprising a third opening and a fourth opening, a wave-shaped guiding structure being formed at the fourth opening, the wave-shaped guiding structure at the fourth opening corresponds to the wave-shaped guiding structure at the second opening, the wave-shaped guiding structure at the fourth opening comprising at least one second recess and at least one second protrusion, the at least one second recess and the at least one second protrusion being alternatively connected.

\* \* \* \* \*